US012511968B1

(12) United States Patent
Jamieson et al.

(10) Patent No.: US 12,511,968 B1
(45) Date of Patent: Dec. 30, 2025

(54) METHODS AND A SYSTEM FOR AUTOMATED EXCEPTION MEDIA ACCESS

(71) Applicant: Cardtronics USA, Inc., Atlanta, GA (US)

(72) Inventors: Daniel James Jamieson, Angus (GB); Michael Jonathon McKaig, Dundee (GB); Robin Ian Gregor Angus, Fife (GB); Sonia Haque, Dundee (GB); Leigh Elisabeth Hughes, Dundee (GB); Gillian McGovern, Monikie Angus (GB)

(73) Assignee: Cardtronics USA, Inc., Atlanta, GA (US)

( * ) Notice: Subject to any disclaimer, the term of this patent is extended or adjusted under 35 U.S.C. 154(b) by 0 days.

(21) Appl. No.: 19/006,327

(22) Filed: Dec. 31, 2024

(51) Int. Cl.
  *G07D 7/00* (2016.01)
  *G07D 7/0047* (2016.01)
  *G07D 11/18* (2019.01)
  *G07D 11/25* (2019.01)

(52) U.S. Cl.
  CPC .......... *G07D 7/0047* (2017.05); *G07D 11/18* (2019.01); *G07D 11/25* (2019.01)

(58) Field of Classification Search
  CPC ....... G07D 7/0047; G07D 11/18; G07D 11/25
  See application file for complete search history.

(56) References Cited

U.S. PATENT DOCUMENTS

| 8,534,548 | B1 * | 9/2013 | Eastman | B65H 7/20 |
| | | | | 109/51 |
| 2002/0011431 | A1 * | 1/2002 | Graef | G07F 19/202 |
| | | | | 271/227 |
| 2004/0245066 | A1 * | 12/2004 | Ichikawa | G07D 11/36 |
| | | | | 194/206 |
| 2013/0075467 | A1 * | 3/2013 | Graef | G07F 19/20 |
| | | | | 235/379 |
| 2014/0238815 | A1 * | 8/2014 | Iwamura | G07D 11/18 |
| | | | | 194/206 |
| 2023/0298424 | A1 * | 9/2023 | Shin | G07D 11/14 |
| | | | | 270/52.01 |
| 2024/0221448 | A1 * | 7/2024 | Hwang | G07D 11/14 |

FOREIGN PATENT DOCUMENTS

EP    4246473 A1 *  9/2023  .......... G07F 19/201

* cited by examiner

*Primary Examiner* — Tuyen K Vo
(74) *Attorney, Agent, or Firm* — Schwegman Lundberg & Woessner, P.A.

(57) ABSTRACT

A system and methods for automated handling of exception media in cash recycling devices. The system enables access to exception media without requiring physical safe access by utilizing a two-way exception container and automated transport mechanisms. Exception media can be automatically moved from storage through validation paths to various destinations including load/unload cassettes or consumer interfaces. The system supports configurable parameters for handling different exception types and can self-reconcile stored media based on defined criteria and timeframes, reducing operational costs by eliminating unnecessary physical interventions while maintaining segregation controls for dispute resolution.

20 Claims, 13 Drawing Sheets

METHODS AND A SYSTEM FOR AUTOMATED EXCEPTION MEDIA ACCESS

BACKGROUND

Cash recycling devices face several operational challenges that limit their full potential and efficiency. While these devices can significantly extend periods between replenishment cycles, they are constrained by the need to balance the automated teller machine (ATM) within certain timeframes to investigate incorrect loading and resolve customer dispute claims-some of which are bound by consumer protection regulations requiring resolution within specific periods.

A critical component of these devices is the exception bin, which stores items requiring separate handling such as retracted notes, rejected notes, and in some countries, suspected counterfeit currency. Currently, accessing this exception media requires physical intervention by operators to retrieve the notes from the exception bin, even when the ATM could otherwise continue operating without requiring replenishment of its main cassettes. This physical access requirement is particularly problematic in environments using load/unload technology, where the core value proposition rests on reducing physical interventions. The situation is further complicated because exception bins frequently fill up outside of normal replenishment periods due to increased bunch sizes in modern recycling devices, often triggering costly emergency service runs. Additionally, when physical access is required, it can only be performed by specifically designated parties, preventing other qualified personnel from accessing exception media to resolve customer claims without creating potential audit and balance claim issues. These limitations result in unnecessarily higher deployment and operating costs while constraining the benefits of recycling technology.

DETAILED DESCRIPTION

Figure 1A:
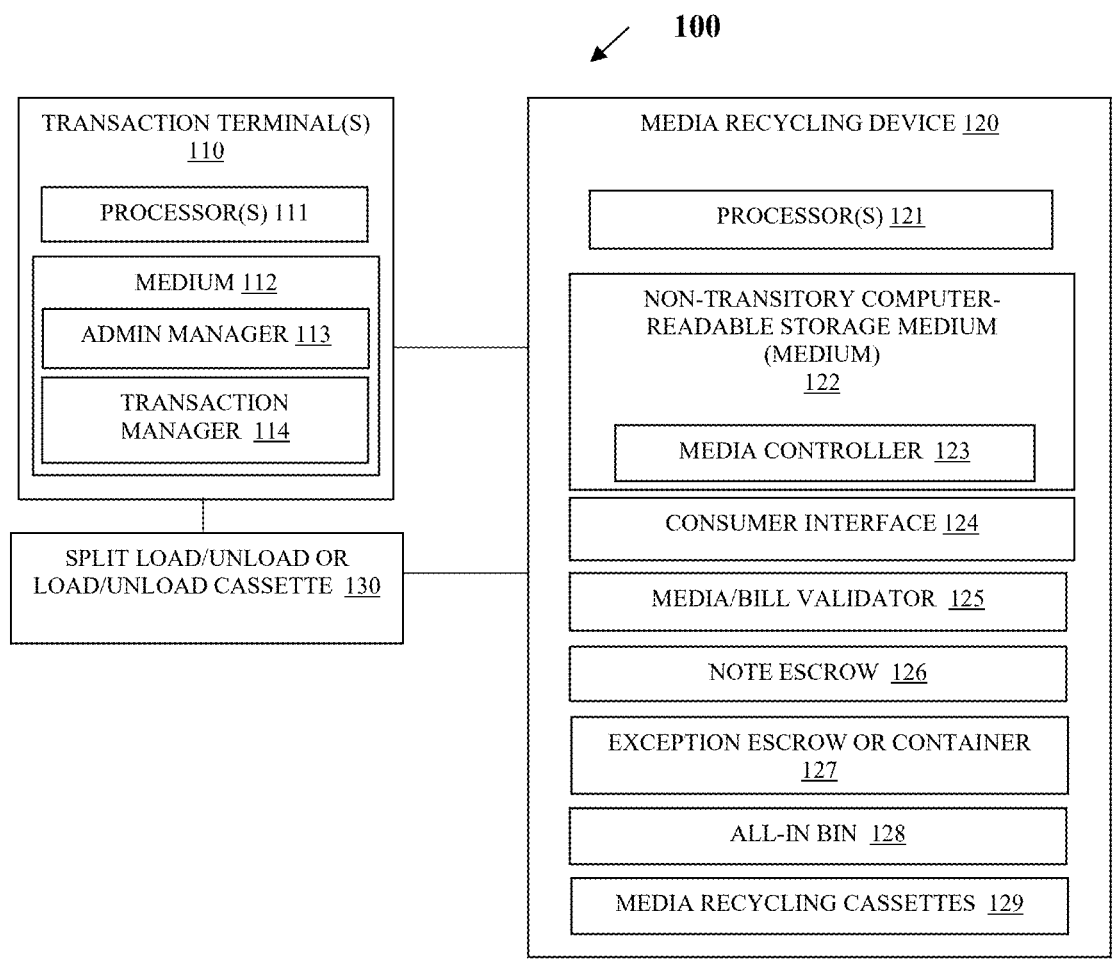
FIG. 1A is a diagram of a system for automated exception media access from a media recycling device, according to an example embodiment.

Cash recycling devices have become increasingly sophisticated in their ability to handle and process banknotes, yet significant operational challenges persist in managing exception media. These devices typically incorporate several key components: a consumer interface for dispensing and depositing media, a bill validator for authentication and quality assessment, a note escrow for temporary transaction holds, recycle cassettes for two-way note movement, deposit cassettes for one-way deposits, and exception bins for storing items requiring special handling. The exception bin serves a critical function in media transaction terminal operations, storing items such as notes retracted when customers fail to retrieve them, notes rejected during dispensing operations, and in many jurisdictions, suspected counterfeit currency that regulations require to be retained.

Current operational media transaction terminal architectures and processes require frequent physical intervention by operators to manage exception media. When exception situations occur, the media is stored in compartmentalized bins that only allow one-way movement, necessitating manual retrieval by cash-in-transit personnel or branch staff during scheduled maintenance or emergency service calls. This physical access requirement has become particularly problematic as modern recycling devices handle larger bunch sizes, leading to more frequent exception bin capacity issues that trigger costly emergency cash/media service runs outside normal replenishment schedules.

The challenge is further complicated in deployments utilizing advanced technologies like load/unload mechanisms, where the primary value proposition centers on reducing physical interventions. While these technologies enable automated handling of standard cash operations, the exception media remains trapped in traditional one-way bins, forcing operators to maintain physical access procedures despite the potential for extended automated operation.

The techniques presented herein address these operational inefficiencies through several innovative approaches. In an embodiment, a two-way exception container replaces the traditional one-way exception bin, enabling automated movement of exception media both into and out of storage. This configuration supports multiple methods for accessing stored exception media without requiring physical safe access, including automated transport to load/unload cassettes or controlled presentation through the consumer interface.

The approaches described herein enable precise tracking and segregation of exception media types while maintaining the security and audit controls necessary for dispute resolution. Through configurable parameters and automated reconciliation capabilities, the system can manage exception media based on defined criteria and timeframes, significantly reducing the operational overhead associated with physical interventions. These techniques integrate seamlessly with existing recycling device components and processes, leveraging established note paths and validation mechanisms to ensure secure and accountable exception media handling.

By enabling automated access to exception media while maintaining strict segregation and control requirements, these approaches fundamentally transform how financial institutions can manage exception scenarios. The flexibility to handle different exception types through various automated channels, combined with programmable reconciliation capabilities, allows institutions to optimize their operations while maintaining compliance with regulatory requirements and internal control procedures.

A "transaction terminal," a "media terminal, a "media transaction terminal," and/or "terminal" refers to a stand-alone composite device operated to perform transactions for or by consumers. A terminal can include an automated teller machine (ATM), a self-service terminal (SST), a point-of-sale (POS) terminal, or a kiosk. The terminal includes a variety of peripheral devices, one of which is a media recycling device. The phrases "media recycling device" and/or "recycling device" may be used synonymously and interchangeably herein.

FIG. 1A is a diagram of a system 100 for automated exception media access from a media recycling device, according to an example embodiment. Notably, the components are shown schematically in simplified form, with only those components relevant to understanding of the embodiments being illustrated.

Furthermore, the various components (that are identified in system 100) are illustrated and the arrangement of the components are presented for purposes of illustration only. Notably, other arrangements with more or less components are possible without departing from the teachings of automated exception media access from a media recycling device, presented herein and below.

System 100 includes a transaction terminal 110, a media recycling device 120, and an optional split load/unload or load/unload cassette 130. Terminal 110 includes at least one processor 111 and a non-transitory computer-readable storage medium (hereinafter just "medium") 112, which includes instructions for an admin manager 113 and a transaction manager 114. The instructions when provided to and executed by processor 111 cause processor 111 to perform the processing or operations discussed herein and below with respect to 113-114.

The media recycling device 120 includes at least one processor 121 and a medium 122, which includes instructions for media controller 123. The instructions when provided to and executed by processor 121 cause processor 121 to perform the processing or operations discussed herein and below with respect to 123. The media recycling device 120 also includes one or a consumer interface 124, a media/bill validator 125 (hereinafter "bill validator 125"), a note escrow 126, and exception escrow or container 127, and all-in bin 128 (i.e., all-in cassette), and a plurality of media recycling cassettes 129. Media controller 123 controls operation of 124-129. 124-129 are electromechanical devices.

The media recycling device 120 includes several integrated components for automated media handling. The consumer interface 124 serves as the primary entry and exit point for media items during transaction processing. The bill validator 125 performs authentication and determines media item validity. The note escrow 126 provides temporary storage during transactions, while the exception escrow or container 127 enables two-way movement of exception media items.

When the exception escrow 127 reaches capacity, the all-in bin 128 provides overflow storage capability. Exception items stored in the all-in bin 128 have their positions (e.g., position data) logged to enable subsequent retrieval. The media recycling cassettes 129 maintain media items for standard transaction processing.

The transaction manager 114 controls consumer deposit and withdrawal operations. For deposit transactions where exception items are detected, the transaction manager 114 either returns items through the consumer interface 124 or directs them to the exception escrow 127 or all-in bin 128.

Through the admin manager 113's administrative user interface, supervisory control over exception media handling is maintained. During exception media access operations, the admin manager 113 can utilize the consumer interface 124 as temporary storage while coordinating movements between the exception escrow 127 and any attached split load/unload cassette 130.

In an embodiment, the split load/unload cassette 130, which connects to an external port of the terminal 110, enables automated exception item removal without requiring physical safe access. The cassette includes separate compartments to maintain segregation of different exception types during removal operations.

The system architecture enables comprehensive exception media handling while maintaining security and audit capabilities. The combination of two-way movement through the exception escrow 127, temporary storage options, and automated transport paths provides flexible options for managing exception scenarios without requiring physical intervention.

Figure 1B:
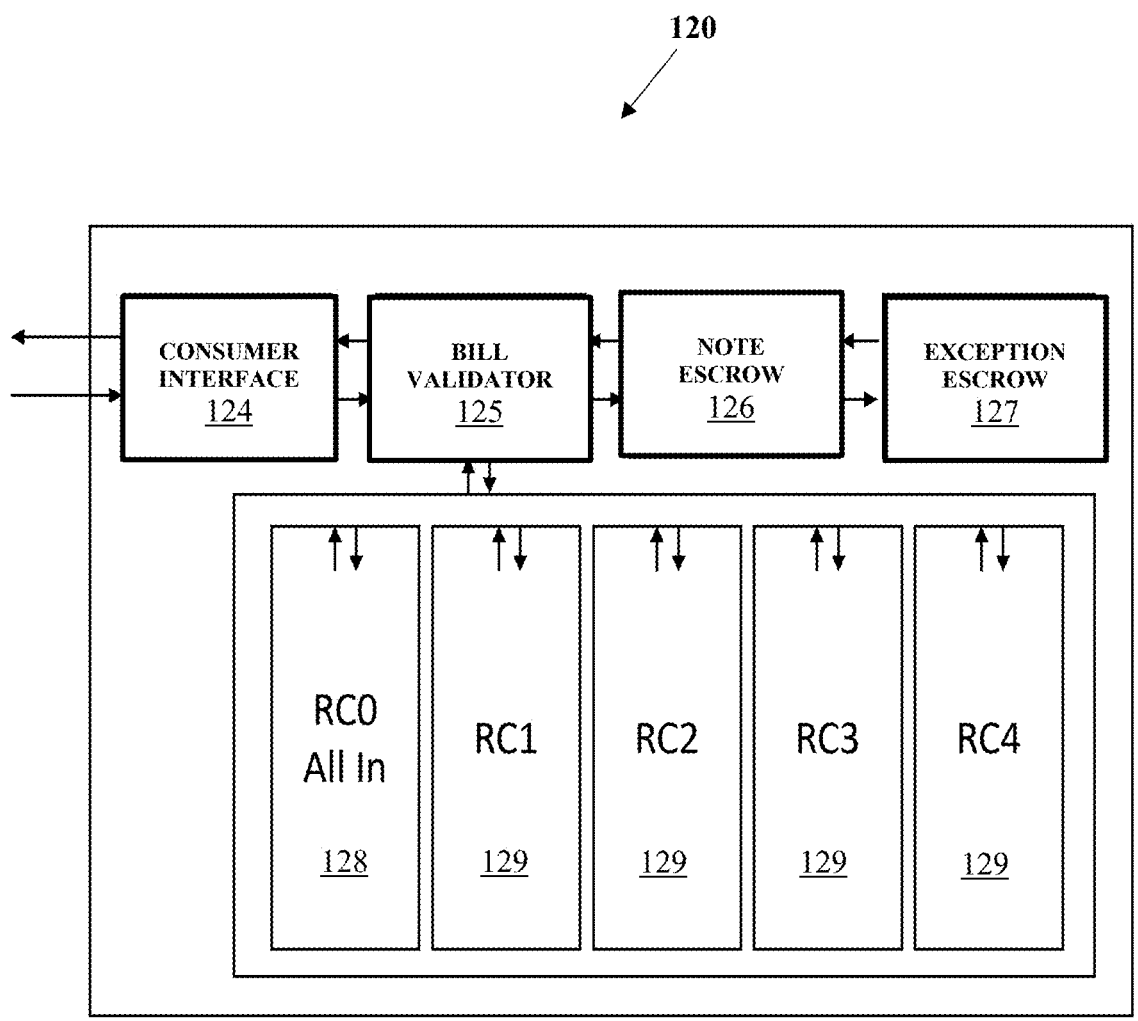
FIG. 1B is a diagram of a media recycling device with an exception escrow, according to an example embodiment.

A variety of different embodiments and operational scenarios for system 100 are now discussed with reference to FIGS. 1B-1L. FIG. 1B is a diagram of a media recycling device 120 with an exception escrow 127, according to an example embodiment.

In an embodiment, the exception escrow 127 is a drum escrow (e.g., a hardware device) which allows for a number of media items ("media items" may also be referred to as "notes" herein) to be stored within in it, and the order of the notes are maintained within the exception escrow 127. The exception escrow is driven by a tape which turns the escrow 127 as notes are deposited so they are stored in a circular fashion within the escrow 127 or the container of the escrow 127.

The drum escrow provides unique technical benefits as the exception storage mechanism by enabling reliable handling of media items of varying quality and condition. Since exception items may be designated as such due to their physical condition, the drum escrow's tape-driven circular storage approach allows for more reliable insertion and removal compared to traditional cassette-based exception storage which can be prone to jams when handling damaged or poor quality media items.

The exception escrow 127 allows exception notes to be placed and stored within the container of the escrow 127.

The media controller 123 maintains a log for the exception notes within the escrow 127 such that exception media item types for the notes and the position/location of the notes within the escrow are known and can be used for auditing, moved to temporary storage during transactions, moved to an overflow storage during transaction, and/or dispensed through the consumer interface 124 or through the split load/unload or load/unload cassette 130 when needed. The arrows depicted in FIG. 1B illustrate the available movement of the notes through the media recycling device 120 during transactions at terminal 110.

The use of a drum escrow in this fashion as the exception escrow 127 allows exception media items to be placed within the exception container when it is determined to be required during a transaction, but also allows for the media items to then be emptied from the exception container if an automated command associated with removing, or completing a self-balance is requested and authorized through the admin manager 113. Emptying of select exception media item types or emptying of all exception media items can be provided through the consumer interface 124 or through split load/unload or load/unload cassette 130.

During a transaction, a media item may be identified as several types of media item exception types. The most typical media item exception type is related to a consumer media dispense or withdrawal transaction in which the media items for the withdrawal are presented through the consumer interface 124 to the consumer and the presented media items are not taken by the consumer within a pre-configured period of time causing the media items to be retracted back into the media recycling device 120 as a "dispense retract" exception. Another media item exception is a "dispense reject" exception, this occurs when the note being dispensed by the media recycling device 120 is not the note that is expected to be dispensed or is identified to be a single pick of multiple notes rather than one as expected, the result of which is the quantity of notes picked is unable to be verified and so the notes are purged to segregate them within the media recycling device 120. Other exception media items include suspected counterfeit media items, confirmed counterfeit media items, or non-bank notes, these types of exception media items are often required to be held for investigation by law enforcement.

Figure 1C:
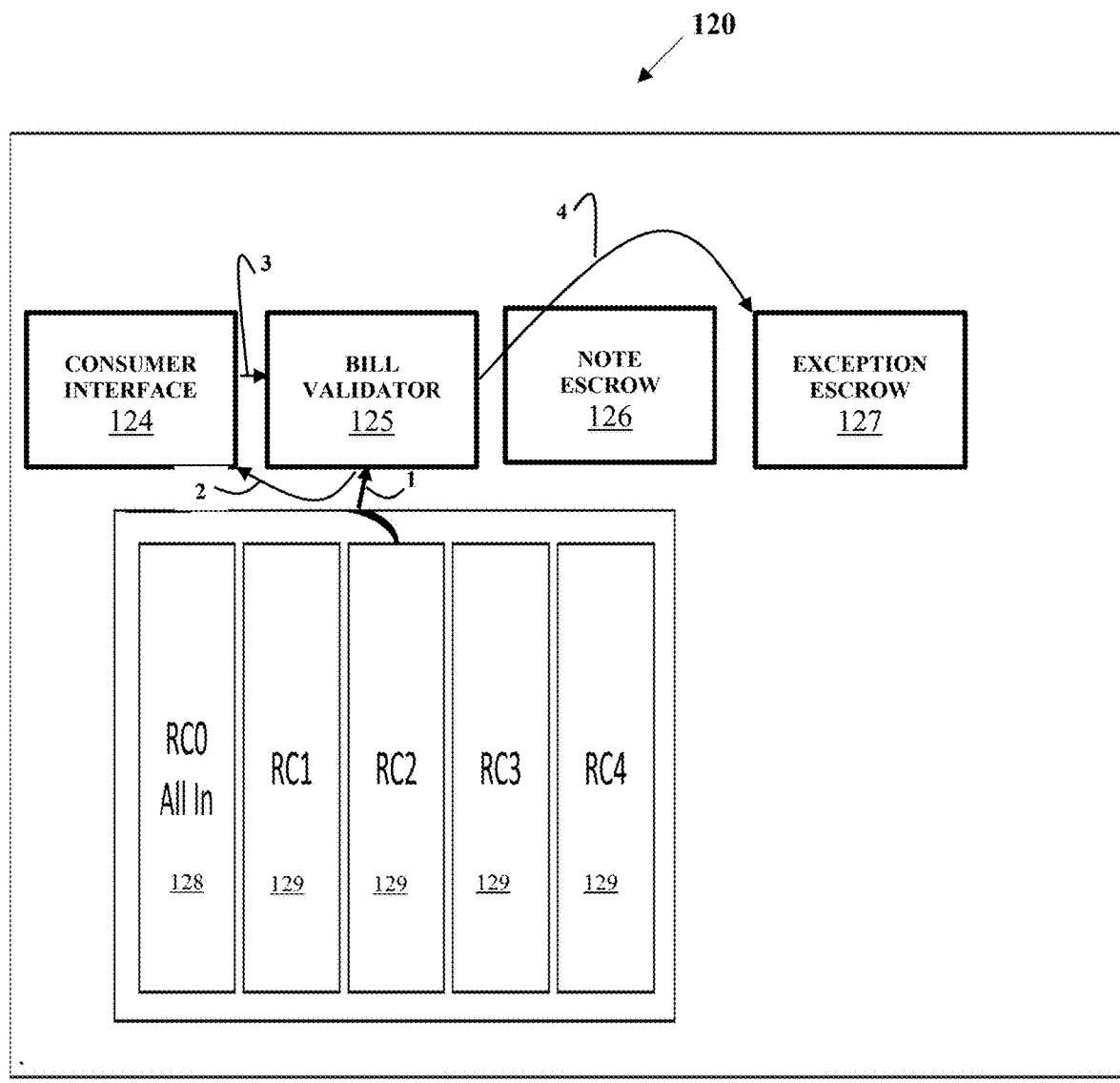
FIG. 1C is a diagram depicting the movement of media items within a media recycling device during a dispense retract exception into an exception escrow, according to an example embodiment.

FIG. 1C is a diagram depicting the movement of media items within a media recycling device 120 during a dispense retract exception into an exception escrow 127, according to an example embodiment. FIG. 1C illustrates a situation in media recycling device 120 has determined that a media item is to be treated as an exception media item based on one of the exception media item types discussed above.

At 1, requested notes are picked from recycling cassette 129, RC2 and transported to bill validator 125. At 2, the bill validator 125 authenticates the banknotes, verifies they are the denomination expected, checks for their fitness for dispense, and they are then moved to the consumer interface 124 and presented to a consumer during a withdraw transaction at terminal 110.

At 3, the banknotes are presented to consumer and for whatever reason not taken by the consumer. This causes a transaction time out and the notes not taken are transported back through the bill validator 125. The bill validator 125 logs the note details (e.g., media item serial number, media item denomination, etc.). At 4, the banknotes are transported into the exception escrow 127 where the position of each note within the exception escrow is logged along with the note details collected by the bill validator 125.

The notes are placed in order in the exception escrow 127 and the note details including exception type are logged by terminal 110. In an embodiment, the logging includes information for each note's position within the exception escrow 127, denomination/note type, serial number, exception type/reason, etc. Some of this information logged can then be exposed to an application of terminal 110 that handles settlement functions when the exception notes is removed from the media recycling device 120 during a replenishment, the application is aware of the exception notes that are held specific locations of the exception escrow 127 during replenishment activities. Notably, the techniques presented herein allow for automated removal of these exception media items via use of the split load/unload or load/unload cassette 130 or other automated mechanism such as the consumer interface 124. Commands issued through the UI of the admin manager 133 permits removal of exception media items of a specific type, specific types, or all exception media items.

Once a note is stored in the exception escrow 127 it is held there until the point that it is required to be removed. Removal may be triggered by policy dictating that exception items must be removed from the device over a certain period to allow them to respond to dispute claims in a timely manner, or it may be triggered by the exception escrow 127 becoming full. Removal can occur in a variety of manners, such as a command executed locally by an operator or administrator, a policy stored locally on the recycling device 120 and/or terminal 110 and executed, or a command executed by an operator when present at the terminal 110.

When exception notes are removed and as the media is transported from the exception escrow 127 to an exit point of the terminal 110 (e.g., consumer interface 124 and/or split load/unload or load/unload cassette 130), the notes follow a standard note path including transit through the note escrow 126 and bill validator 125. Notably, if the command issued was to pull only a certain type of exception items, for example dispense retract, and leave others, the note escrow 126 is used as a temporary storage to hold notes of exception types not being requested and then transported back to the exception escrow 127 once the notes requested are dispensed at a destination (e.g., consumer interface 124, split load/unload or loan/unload cassette 130). This is achieved through the detailed logging maintained for the position of each exception media item within the media within the media recycling device 120.

Figure 1D:
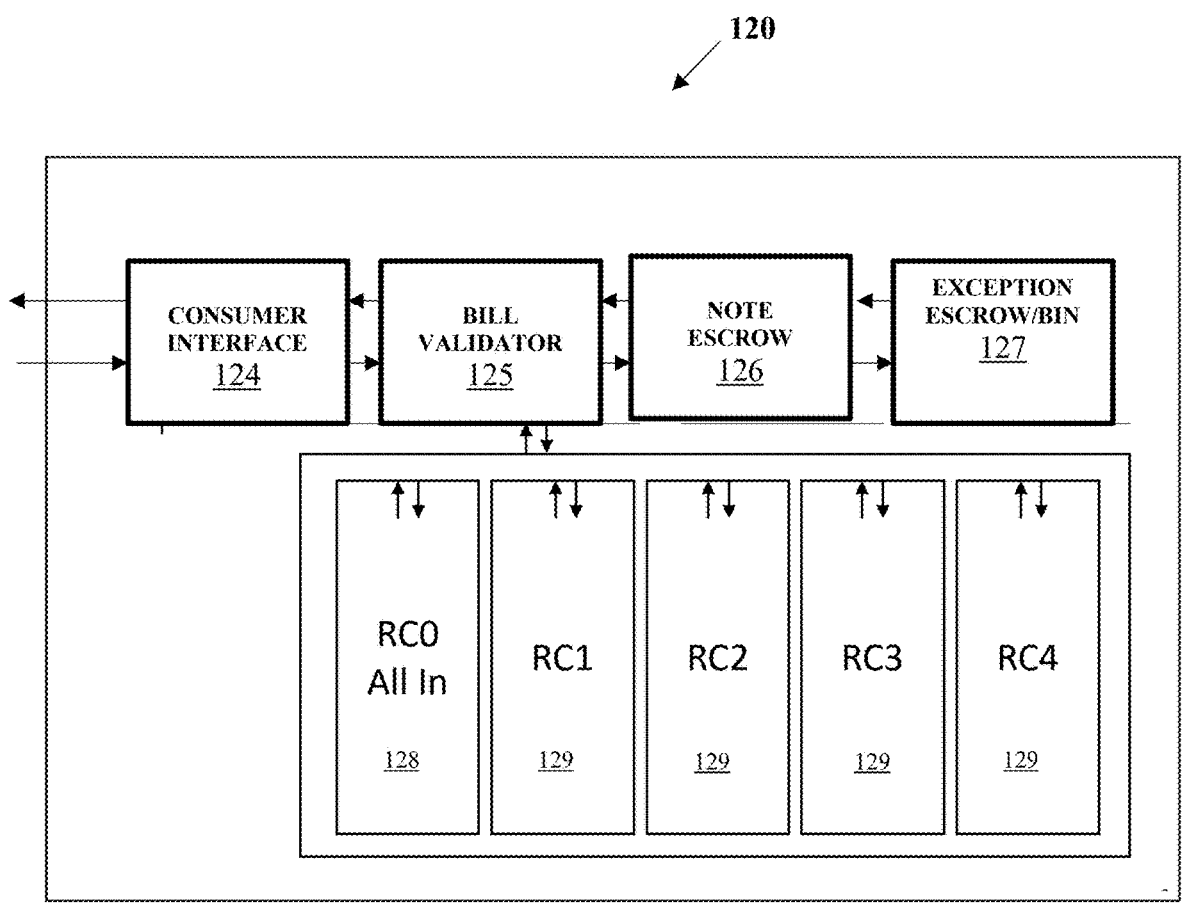
FIG. 1D is diagram depicting media item flow within a media recycling device with an exception bin, according to an example embodiment.

FIG. 1D is diagram depicting media item flow within a media recycling device 120 with an exception bin, according to an example embodiment. The configuration of the media recycling device 120 illustrated in FIG. 1D shows that exception media items or notes can be dispensed to an administrative user via consumer interface 124.

That is, physical intervention and presence of an administrative user is not required at the terminal 110 to open the media recycling device 120 and retrieve exception media items; rather, the administrative user operates the UI of the admin manager 113 to initiate commands to retrieve specific exception types of exception media items or to retrieve all the exception media items and the corresponding items are retrieved by the administrative user through the consumer interface 124. The UI of the admin manager 113 presents supervisor screens, and the admin manager 113 authenticates the administrative user for authorized access to the commands relevant to retrieval of exception media items from the media recycling device 120. For example, once the administrative user is authenticated and the supervisory mode is initiated, the user may issue a dispense exception command that instructs media controller 123 to cause the movement of the requested media items from the two-way exception escrow 127 and transport the media items to the consumer interface 124 for retrieval by the administrative user.

During movement of the requested media items from the two-way exception escrow 127 to the consumer interface 124, the media items are passed through the bill validator 125, which validates the media items against the logs maintained for the exception media items. Assuming the media items are validated, they are moved to a media bunch stacking module within the consumer interface 124 and dispensed through a shutter or pocket interface module of the consumer interface 124 to the administrative user.

In an embodiment, when more than one media item exception type is being requested by the user, the media controller 123 controls the flow of the media items to ensure that separate media bunches are presented to the user through the consumer interface 124, each bunch associated with a specific exception media item type. This is achieved in a variety of manners as illustrated in FIG. 1E.

Figure 1E:
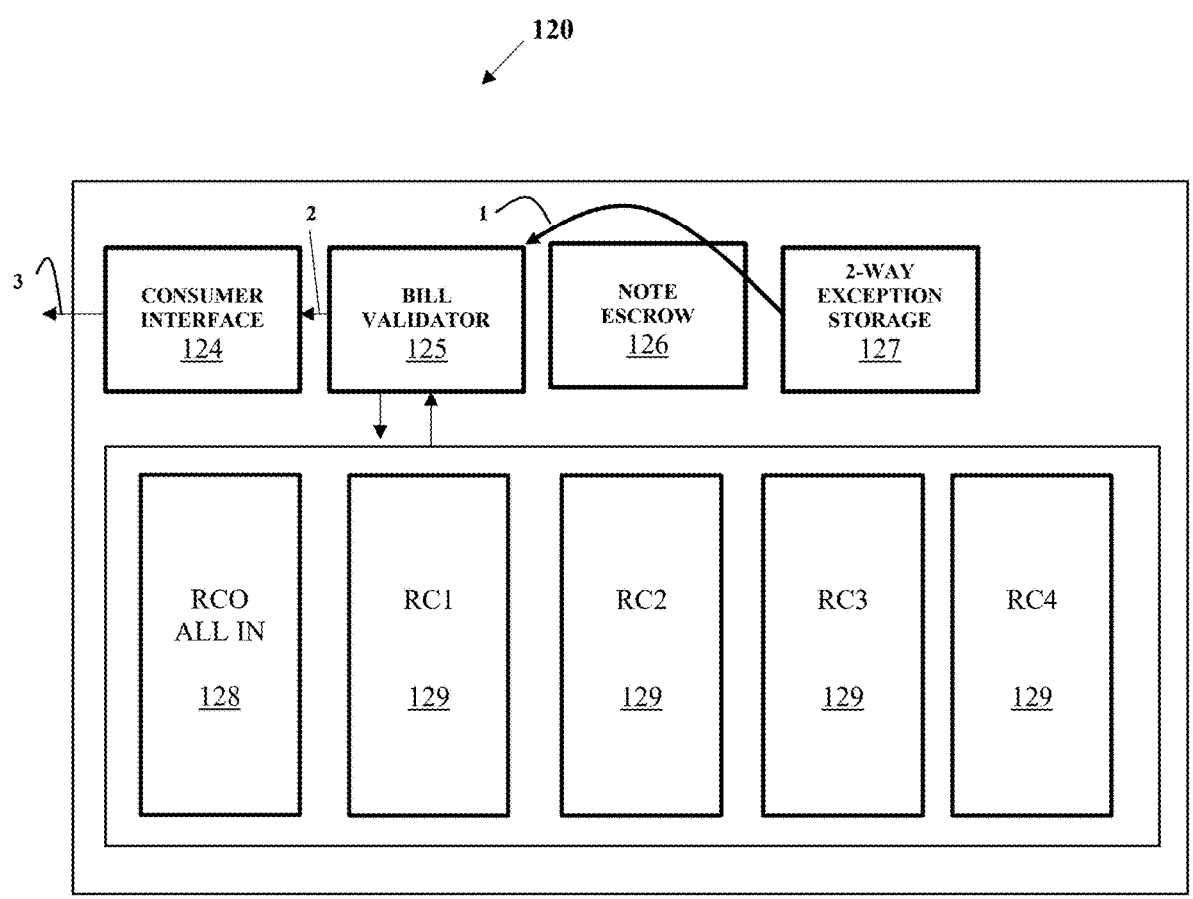
FIG. 1E is a diagram depicting the movement of media items within a media recycling device having a two-way exception storage, according to an example embodiment.

FIG. 1E is a diagram depicting the movement of media items within a media recycling device 120 having a two-way exception storage 127, according to an example embodiment. FIG. 1E show the different manners in which an administrative user can have exception media items a single exception type or multiple exception types automatically dispensed through the consumer interface 124 of the media recycling device 120.

The two-way exception escrow or storage 127 segments the exception media items by exception types within the storage 127. The user choses to dispense all, or only one of the exception types. If all is selected, the media controller 123 controls the media recycling device 120 to dispense each exception type sequentially to the user by picking sequentially from a corresponding segmented compartment of the two-way exception escrow storage 127.

When the administrative user requests media items of a single exception type. The media controller 123, at 1, causes the media items of the requested exception type to be picked from the exception escrow storage 127 and transported to the bill validator 125.

At 2, the bill validator 125 validates the media item is as expected as each media item travels through the bill validator 125. Each media item is then transported to the consumer interface 124.

At 3, the exception media items are stacked into a bunch of exception media items. The bunch is then dispensed to the administrative user.

When the administrative user requests media items for all the exception types, the media controller 123 iterates through 1-3 for each different media item exception type. In this way, the user is sequentially presented with bunches of exception media items, each bunch associated with a specific media item exception type.

Figure 1F:
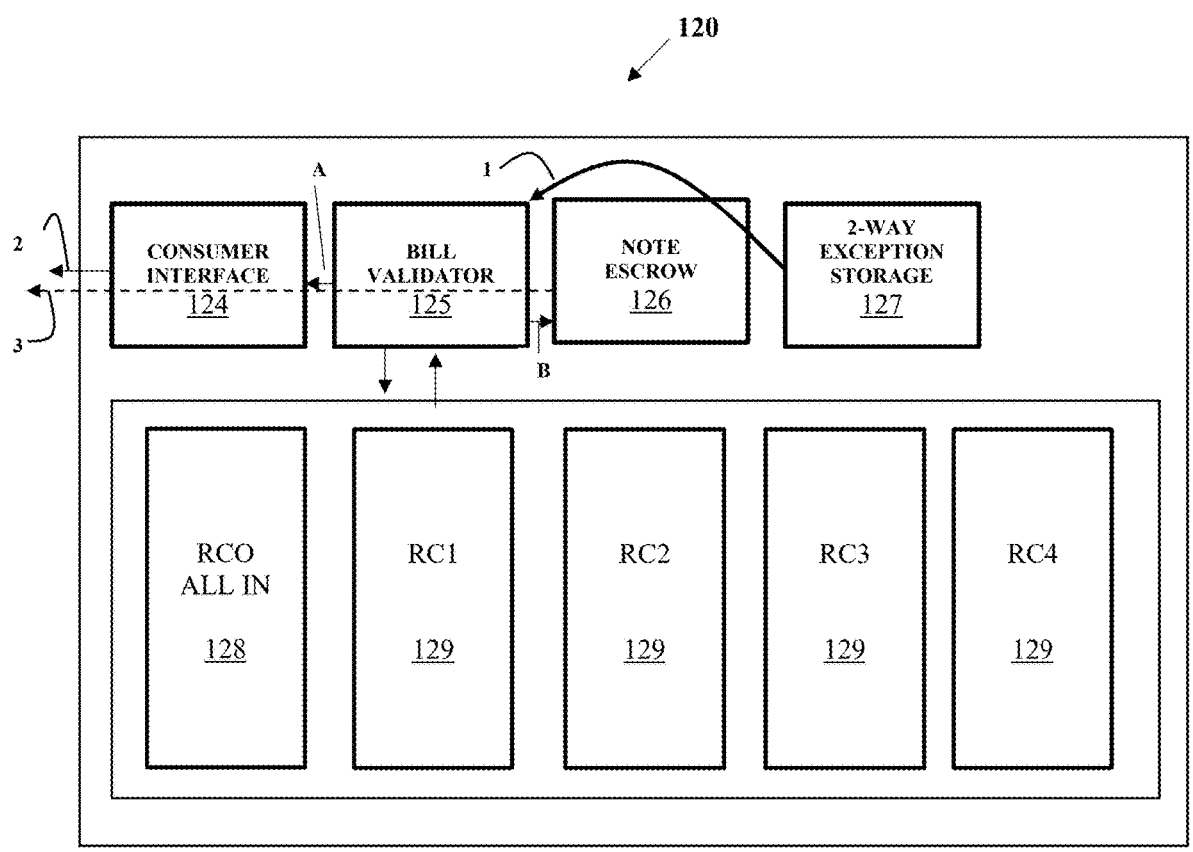
FIG. 1F is a diagram depicting the movement of media items from a mixed exception container of a media recycling device when dispensing multiple types of media items, according to an example embodiment.

FIG. 1F is a diagram depicting the movement of media items from a mixed exception container of a media recycling device 120 when dispensing multiple types of media items, according to an example embodiment. FIG. 1F illustrates a situation in which the administrative user is permitted to request two media exception types for automated removal via admin manager 113.

At 1, media controller 123 controls media recycling device 120 to transport each note, in order, from the two-way exception escrow or storage 127 into the bill validator 125. Bill validator 125 validates the note is as expected. The media controller 123 ascertains, through referencing the media item logs, the exception type of the note from the given position known for the note within the two-way exception escrow or storage 127.

At A, the media controller 123 causes each exception note of a specified exception type to be transported from the bill validator 125 to the consumer interface 124 where the each note is stacked and prepared for dispense. At B, the media controller 123 causes each exception note of a different or second exception type to be moved from the bill validator 125 to the note escrow 126 where it is held until a later point.

At 2, the consumer interface 124 stacks the notes of a first exception type to be stacked in a bunch. The bunch is then dispensed through a shutter to the user for collection.

At 3, the media controller 123 causes each exception note of a second exception type to be transported, via the bill validator 125 to the consumer interface 124. The consumer interface 124 stacks the notes of the second exception type in a bunch. The bunch is then dispensed through a shutter to the user for collection.

Figure 1G:
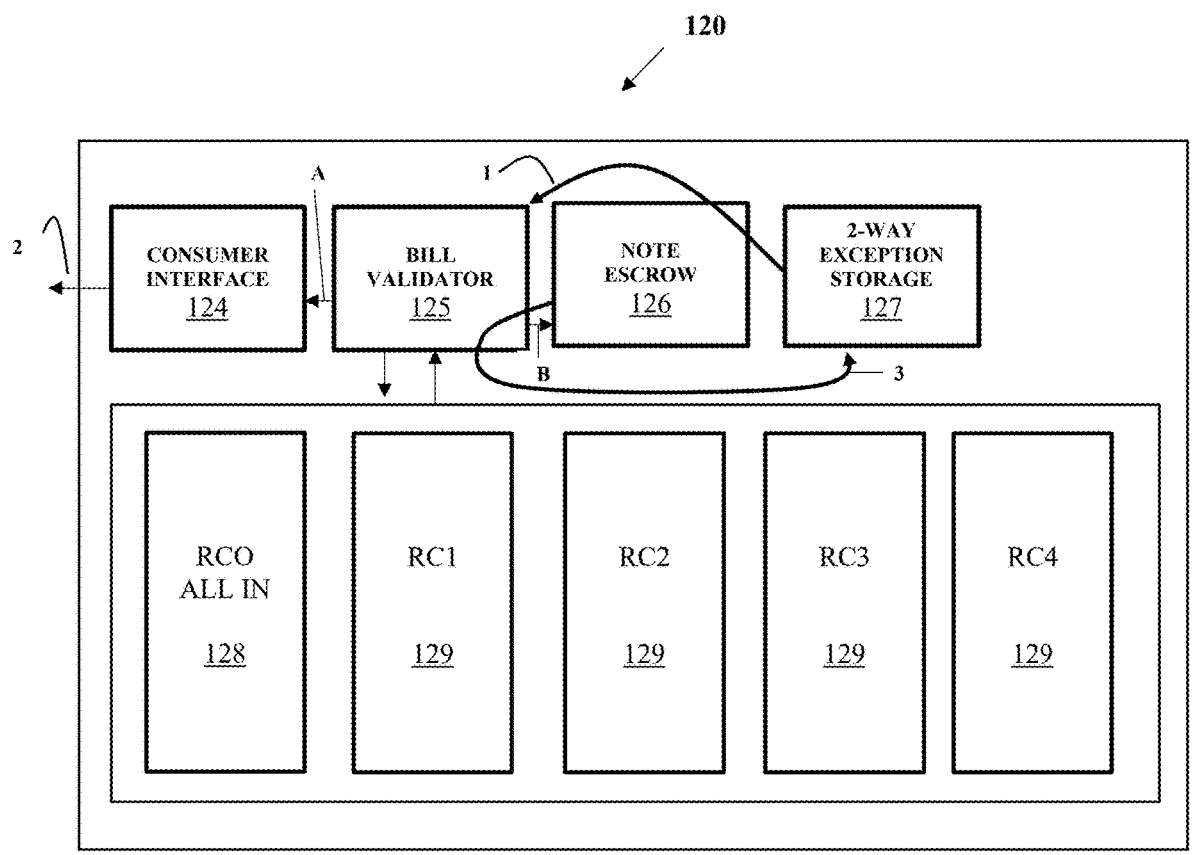
FIG. 1G is a diagram depicting the movement of media items from a mixed exception container of a media recycling device when dispensing a single media item type, according to an example embodiment.

FIG. 1G is a diagram depicting the movement of media items from a mixed exception container of a media recycling device when dispensing a single media item type, according to an example embodiment. FIG. 1G illustrates a scenario when the two-way exception escrow or storage 127 is not segmented or compartmentalized such that exception media items and their exception types are sequentially stored in the two-way exception escrow or storage 127 in no order resulting in mixed exception types dispersed within the two-way exception escrow or storage 127. FIG. 1G also illustrates a scenario in which the administrative user is requested exception media items of a single and specific exception type.

At 1, the media controller 123 causes the exception notes to be pulled in order from the two-way exception escrow or storage 127 and transported to the bill validator 125. Using media item logs, the bill validator 125 identifies the exception types for the media items. In an embodiment, the positions of the notes within the two-way exception escrow or storage 127 are linked or mapped to the exception types.

At A, the media controller 123 causes media items of the user-requested exception type to be transported from the bill validator 125 to the consumer interface 124. The consumer interface 124 each media item in a stack and prepares for dispense to the user. At B, the media controller 123 causes exception media items associated with a second exception type to be moved to the note escrow 126 until a later point.

At 3, the stacked media items of the user-requested exception type is dispensed and presented to the user for collection. At 4, the media controller 123 causes the exception media items of the second type to be returned via the bill validator 125 to the two-way exception escrow or storage 127.

Figure 1H:
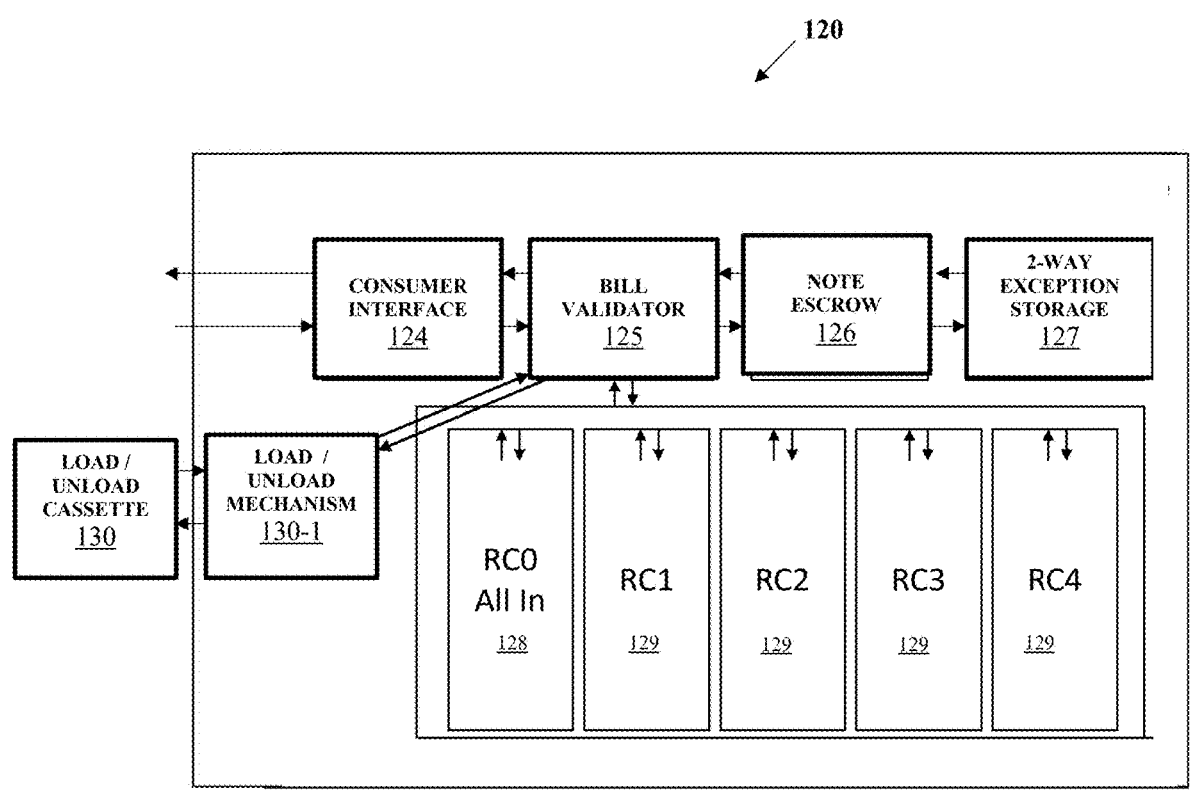
FIG. 1H is a diagram depicting the movement of media items within a media recycling device having a two-way exception storage and a load/unload media cassette, according to an example embodiment.

FIG. 1H is a diagram depicting the movement of media items within a media recycling device 120 having a two-way exception storage 127 and a load/unload media cassette 130, according to an example embodiment. The load/unload media cassette 130 attached to a port on the fascia of the terminal 110, this permits consumers to perform mass deposits or cash pulls via the load/unload media cassette 130 rather than manually feeding deposited notes as bunches or individually through the consumer interface 124. The load/unload media cassette 130 is used in a different manner with the teachings provided herein for purposes of allowing an administrative user to retrieve exception media items from the media recycling device rather then physically accessing the safe of the media recycling device; the safe includes the all-in bin 128 and media recycling cassettes 129.

In an embodiment, the load/unload cassette 130 is a compartmentalized cassette which permits different denominations of media items to be segmented within the load/unload cassette 130. In these embodiments, the exception media items being removed from the recycling device 120 can be automatically stored and segmented within the compartments of the load/unload cassette by media item exception type. In another embodiment, the load/unload cassette 130 is not compartmentalized and is effectively a standalone recycling cassette.

Retrieval of the media exception items via the load/unload media cassette 130 can occur utilizing an existing compartmentalized two-way container/cassette to remove a single specified exception type or utilizing a two-way exception container, which has the exception media items and their exception types intermixed therein, to remove all media exception items of all exception types.

FIG. 1H illustrates the media item movement paths for a two-way exception storage 127 of a recycling device 120 utilizing the load/unload media cassette 130. Each module illustrated (124-129, 130, and 131) show that media items are capable of being transported into a corresponding module or transported out of a corresponding module.

Figure 1I:
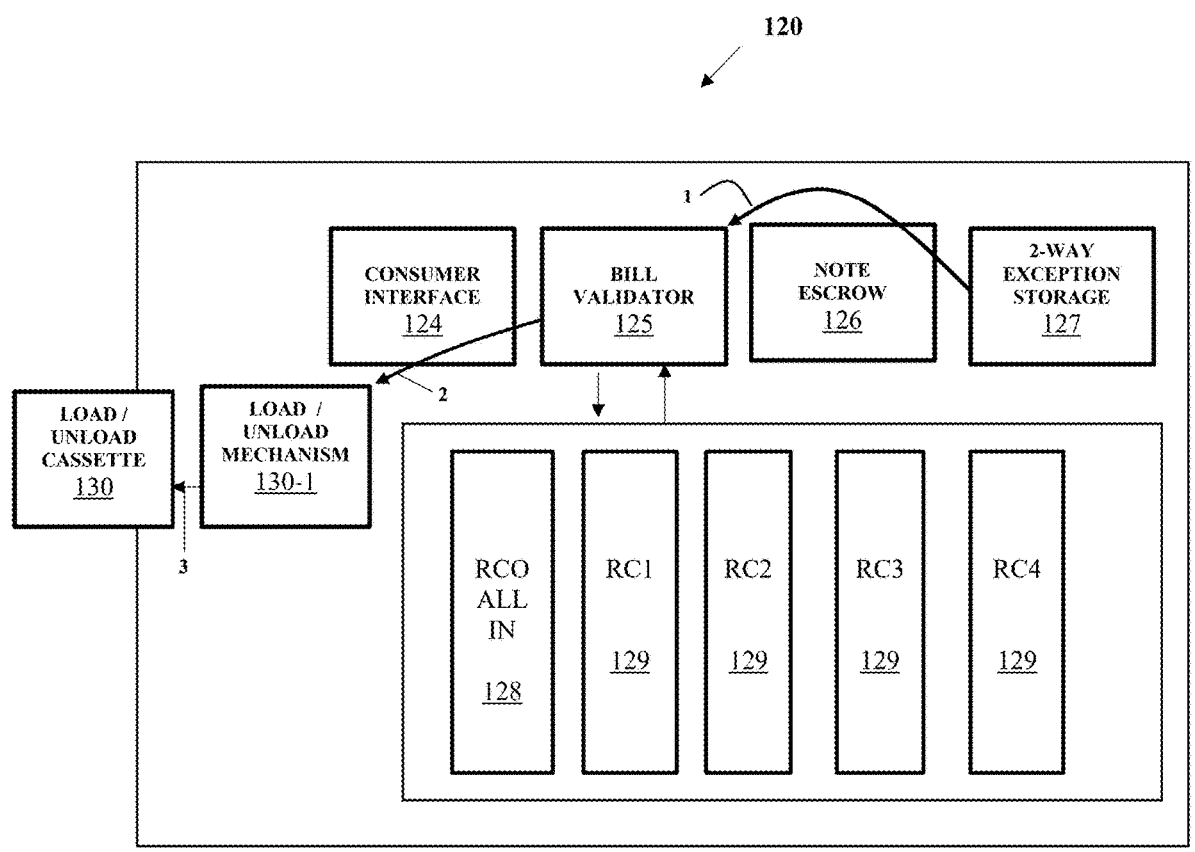
FIG. 1I is a diagram depicting the movement of media items within a media recycling device from a compartmentalized/segregated two-way exception container, according to an example embodiment.

FIG. 1I is a diagram depicting the movement of media items within a media recycling device 120 from a compartmentalized/segregated two-way exception storage/container 127, according to an example embodiment. At 1, the media controller 123 causes exception media items of a first exception type, or of a user-specified type, to be picked from the two-way exception storage and transported to the bill validator 125.

At 2, the bill validator 125 validates the media items are as expected as each media item travels through the bill validator 125. The media items are transported from the bill validator 125 to a load/unload mechanism 130-1 associated with the load/unload media cassette 130. At 3, the media items are then moved via the load/unload mechanism 130-1 into the external load/unload media cassette 130 and media counts are updated to reflect the media items that have been removed from the media recycling device 120.

The scenario illustrated is a situation in which the administrative user issued a "type clear" command through the UI of the admin manager 113. This causes media controller 123 to pick each exception media item of the user-specified exception type from the two-way exception storage/container 127, transport each picked item through the bill validator 125, and to a designated destination, which is the load/unload media cassette 130. If the user issued a "mixed clear" command instead of the type clear command, the media controller iterates 1-3 for each different exception media item type. Notably, as exception media items are placed within the load/unload media cassette 130 counters are updated so that when settlement is completed by the administrative user, the counts of each exception type withdrawn are referenced to assist with reconciliation.

In an embodiment, the load/unload cassette 130 is a compartmentalized cassette which permits different denominations of media items to be segmented within the load/unload cassette 130. In these embodiments, the exception media items being removed from the recycling device 120 can be automatically stored and segmented within the compartments of the load/unload cassette by media item exception type.

Figure 1J:
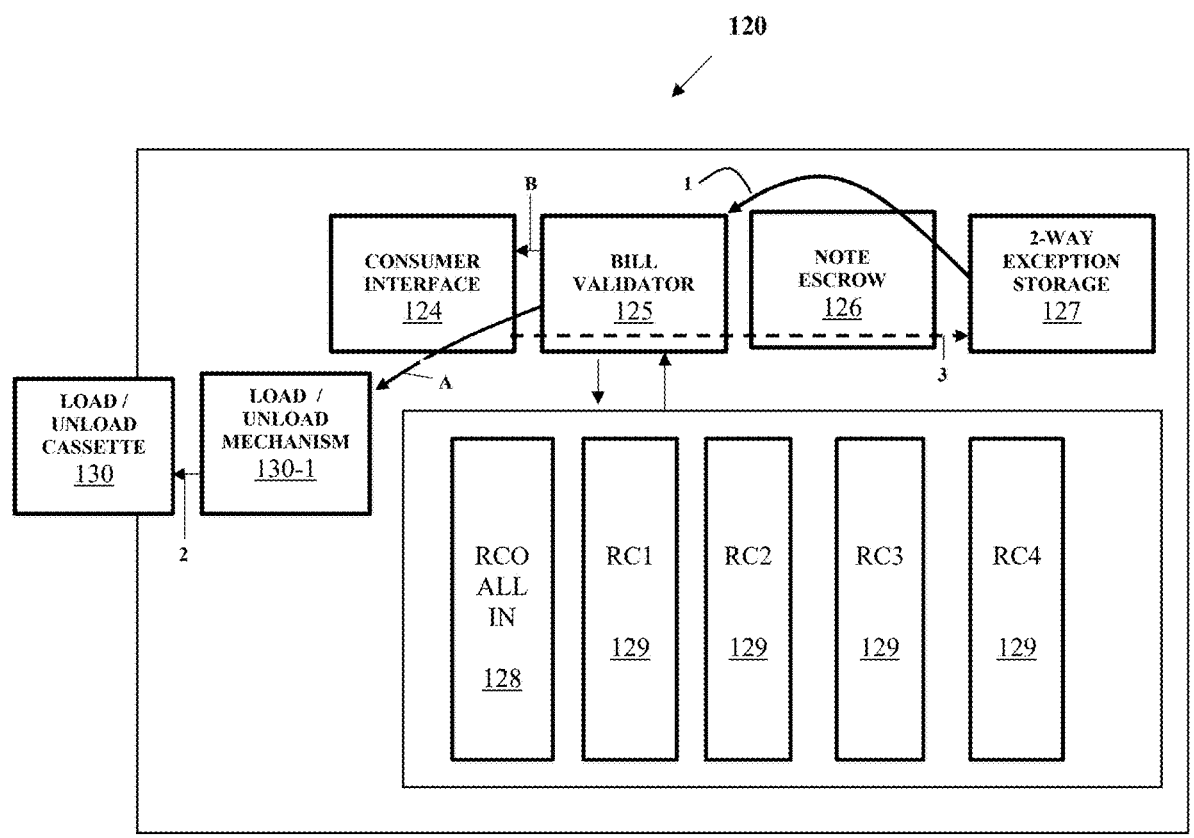
FIG. 1J is a diagram depicting the movement of media items from a mixed exception container of a media recycling device when a single media item type is being dispensed, according to an example embodiment.

FIG. 1J is a diagram depicting the movement of media items from a mixed exception container of a media recycling device when a single media item type is being dispensed, according to an example embodiment. FIG. 1J illustrates a situation in which the exception media items with different exception media item types are intermixed within the two-way exception storage 127.

At 1, the media controller 123 causes the exception media items stored in the two-way exception storage 127 to be pulled in a sequential order from the two-way exception storage. The media controller 123 causes the pulled media items to be transport to the bill validator 125. Logs are check, and in an embodiment, the position within the two-way exception storage 127, which is logged for a given pulled media item, is mapped to a specific exception type.

At A, the media controller 123 causes the exception media items of a specified exception type to be transported to the load/unload mechanism 130-1. At B, the media controller 123 causes exception media items for a second and different exception type from the specified exception type to be moved the consumer interface where it is held until a later point; essentially, the consumer interface 124 is used as a temporary storage for the media items of the second exception type during the transaction/command being processed via terminal 110.

At 2, the load/unload mechanism 130-1 deposits the exception media items of the specified exception type into the external load/unload cassette 130. Media counts are updated within the media item logs to reflect the media items removed from the recycling device 120 and deposited into the load/unload cassette.

At 3, the media controller 123 causes the exception media items of the second exception type to be returned back to the two-way exception storage 127. This return note path is via and through bill validator 125.

If a type clear command was initiated by the administrative user through the UI of the admin manager 113, notes are pulled sequentially from the two-way exception storage 127. They are transported to the bill validator 125 where they are validated as expected. The exception type of each item has been stored in the media item or device logs and so at this point the exception type of the media items are known. If the exception type is as specified for removal in the type clear command, the corresponding media items are moved via the media transport to the load/unload cassette 130, stored within the load/unload cassette. If any given exception media item is not of the specified exception type, the media item is placed temporarily within the consumer interface 124 where it is held until the operation completes. This is used instead of a the note escrow 126 as it allows for faster movement of the media items as otherwise the media items would be required to move on-by-one as since a media item could not exit the bill validator 125 to go to the note escrow 126 if another media item was waiting on the transport to enter the bill validator 125 from the two-way exception storage 127. This repeats for each media item in the two-way exception storage 127 until all media items of the specified exception type are removed from the two-way exception storage 127. The remaining exception media items are then transported from the consumer interface 124, to the bill validator 125, and finally to the two-way exception storage 127. Media item counts are automatically updated as the media items move to allow for settlement to be completed by the administrative user. If necessary, the administrative user can complete the desired command via several operation requests and using multiple load/unload cassettes 130 to clear all exception types.

In an embodiment, the load/unload cassette 130 is a compartmentalized cassette which permits different denominations of media items to be segmented within the load/unload cassette 130. In these embodiments, the exception media items being removed from the recycling device 120 can be automatically stored and segmented within the compartments of the load/unload cassette by media item exception type.

Figure 1K:
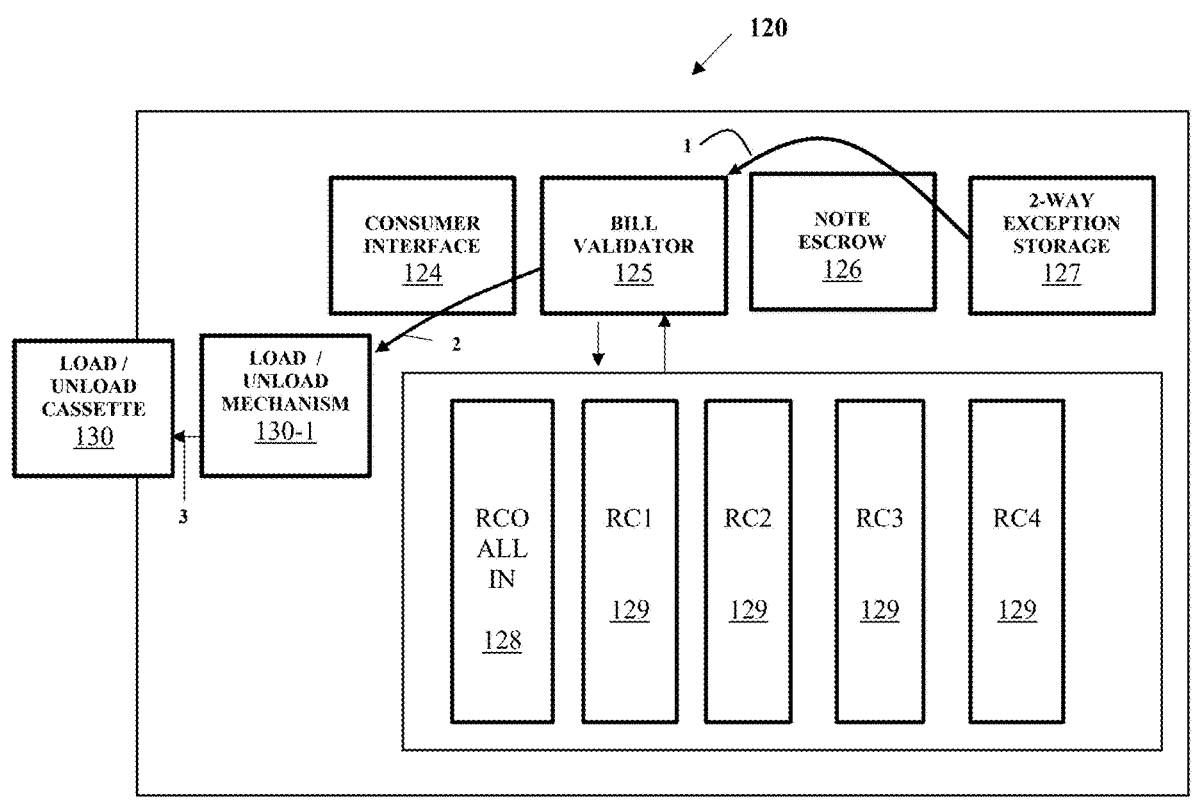
FIG. 1K is a diagram depicting the movement of media items within a media recycling device from a mixed exception container when dispensing all media item items into a single load/unload cassette, according to an example embodiment.

FIG. 1K is a diagram depicting the movement of media items within a media recycling device 120 from a mixed exception container when dispensing all media item items into a single load/unload cassette 130, according to an example embodiment. FIG. K illustrates a mixed exception container when an administrative user is requesting removal of exception media items of all exception types from the two-way exception storage 127.

FIG. 1K illustrates a situation in which the administrative user using the UI of the admin manager 113 issues a mixed clear command to remove all exception media items for all exception types.

At 1, the media controller 123 causes the media items to be pulled from the two-way exception storage 127 and transported to the bill validator 125. The bill validator 125 validates the media items and ascertains, through referencing the device or media item logs, the exception type for each media item based on a given position of a corresponding media item within the two-way exception storage as noted in the logs.

At 2, the media controller 123 causes the media items to be moved sequentially to the load/unload mechanism 130-1. At 3, the load/unload mechanism deposits the media items into the load/unload cassette 130. Media item counts are updated to reflect the media items of each exception type which were removed from the recycling device 120.

In an embodiment, the load/unload cassette 130 is a compartmentalized cassette which permits different denominations of media items to be segmented within the load/unload cassette 130. In these embodiments, the exception media items being removed from the recycling device 120 can be automatically stored and segmented within the compartments of the load/unload cassette by media item exception type.

Figure 1L:
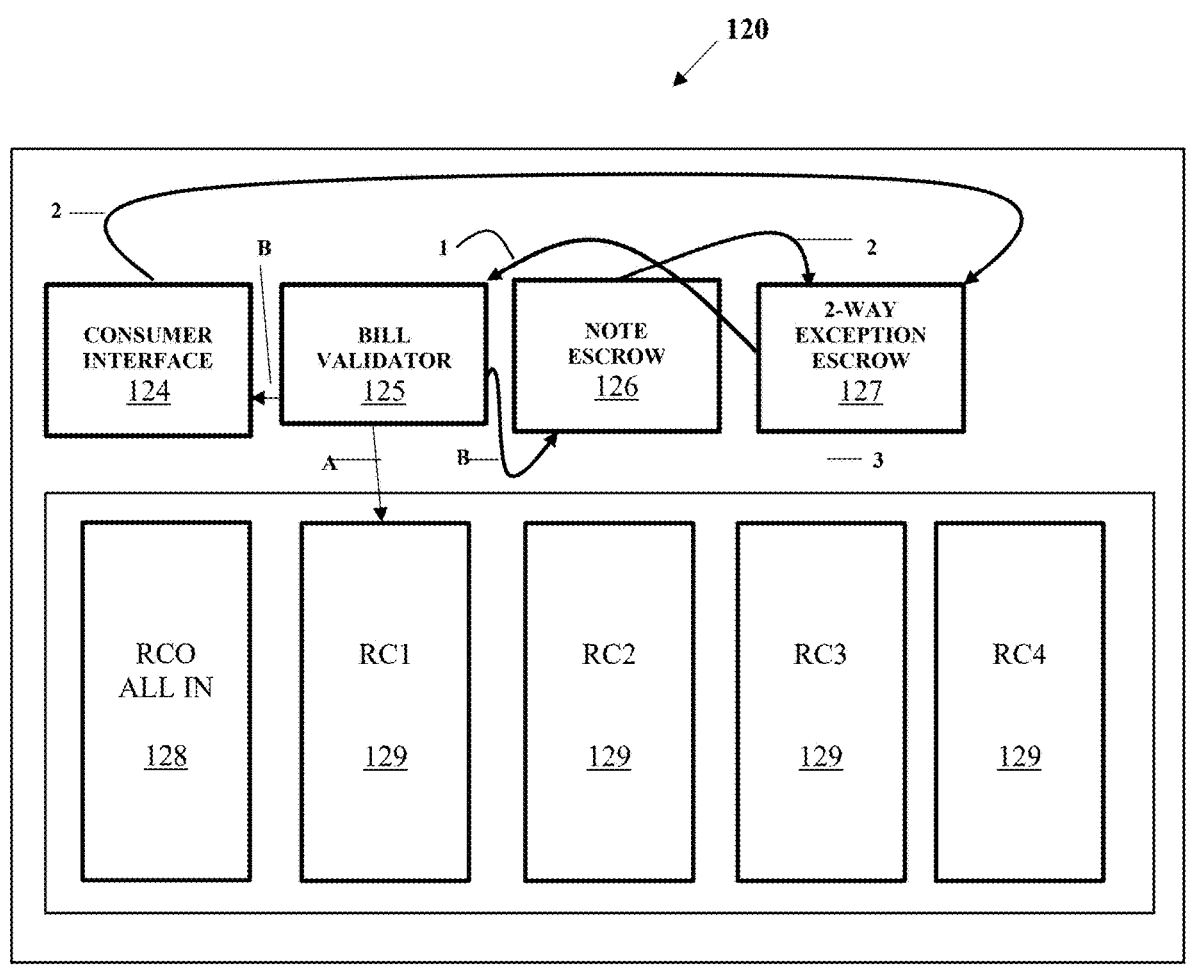
FIG. 1L is a diagram depicting the movement of media items within a media recycling device from an exception container during a self-reconcile administrative operation/command, according to an example embodiment.

FIG. 1L is a diagram depicting the movement of media items within a media recycling device 120 from an exception container during a self-reconcile administrative operation/command, according to an example embodiment. FIG. 1L illustrates commands that can be processed remotely over a network connection to terminal 110 or commands that can be initiated by an administrative user through the UI of admin manager 113. The commands are processed by media controller 123 of media recycling device 120 for purposes of auditing and/or reconciliation of exception media items housed within the recycling device 120.

When a command is issued through a network connection remotely or through the admin manager 113, at 1, media controller 123 picks each media item individually from the two-way exception storage 127 and transports each media item to the bill validator 125. The logs and metadata of each media item is checked against criteria provided with the command; for example, a time constraint or criterion (e.g., duration of time), an exception type constraint or criterion, a combination of time and exception type constraints or criteria, etc.).

At A, if a media item being evaluated meets the criteria, the media controller 123 causes the media item to be moved through the media recycling device 120 into a defined destination cassette 128 or 129 and media item counts are updated for both the two-way exception storage 127 and the corresponding designated destination cassette 128 or 129. At B, if the media item does not meet the criteria, the media controller 123 moves the media item to either the consumer interface 124 or the note escrow 126 where it is temporarily stored for the operation of the command.

At 2, once all the media items have been moved, the media controller 123 causes the media items that were temporarily stored in either the consumer interface 124 or the note escrow 126 to be returned and transported back to the two-way exception storage 127. At 3, upon completion of the command, the detail of each media item's movement within the recycling device 120, including its serial number, exception type, and movement (from/to) are logged in the media item or device logs for future reference.

Once the command completes, the media item counts in the media item and device logs for each cassette and container are reflected of the increment/decrement that occurred for the command. The media items left in the two-way exception storage 127 is that which the financial institution (FI) associated with terminal 110 has determined should be left in the two-way exception storage 127. That is, the media items moved within the recycling device 120 are the media items that the FI determined to move. The activity of each media item is also noted in the media item and device logs for audibility.

If the FI requires physical access to any of the exception media items at any point, then notably, they are still physically segregated within the recycling device 120. This means that if the FI needs to investigate a claim or a dispute, they can define the parameters and time the media items are stored for, they can keep the media items in the two-way exception storage 127 for a given period of time and can arrange for the attendance of an administrative user to collect the media items in dispute. The FI is quickly and fully equipped to settle the dispute with the necessary information and with the media items in dispute.

The techniques presented herein provide significant value through enabling ATM deployers to increase the efficiency of their recycling deployments while maintaining their ability to respond promptly to customer disputes. By materially increasing the period between physical safe access requirements, which typically results in full ATM replenishment to support broader balancing activities, the system reduces operational costs while ensuring all parties remain satisfied during audit or out-of-balance claims.

A key advantage of this approach is that it potentially enables alternative parties beyond the main ATM replenisher to gain access to exception media for dispute resolution, without creating challenges in case of out-of-balance events. For example, if an ATM is typically serviced by cash-in-transit personnel, branch staff can potentially use this functionality to access exception cash as part of daily or weekly activities, while still allowing the main bulk of cash within the safe to be exclusively accessed by the cash-in-transit third-party.

The solution seamlessly integrates into banks' existing reconciliation processes, which are typically very difficult to change due to risk management requirements. It permits notes to be stored for a configurable period that the bank can determine in-line with their business processes. For example, if they want to leave notes for 30 days before running a self-reconciliation command, they can do so to allow time for potential claims while still maintaining the ability to return cash to circulation after that period. The solution's security features extend beyond physical safeguards, incorporating validation checks during all media movements to ensure exception items match their logged positions and characteristics. This creates multiple verification points that maintain the audit trail while preventing unauthorized access or manipulation of exception media.

The configurable storage periods can be set differently for different exception types, allowing banks to maintain suspect or counterfeit notes for longer investigation periods while enabling faster recycling of retracted or rejected notes that meet quality standards. This granular control over exception media handling timeframes helps optimize the balance between operational efficiency and risk management requirements.

There is also a material impact on operating expenses through this solution. When full exception bins currently trigger replenishment activity despite recycle or deposit cassettes not yet requiring it, this system allows for those replenishment periods to be extended by offering a route to free up space within the exception container. These emergency cash runs can carry costs in excess of $1,000 each, making this automation particularly valuable as banks configure recyclers to operate for extended periods of several months between replenishments.

The solution maintains the segregation of exception media by exception type in external destination cassettes, which is critical for allowing the solution to fit into ATM deployer processes as it preserves exactly how cash is separated to allow for efficient resolution of customer disputes. Additionally, versus solutions that expose exception media directly to operators, this approach does not create security risks through potential pilfering or theft, as the exception media can be placed into secure cassettes using various methods like keylocks or ink staining to deter such activity.

Figure 2:
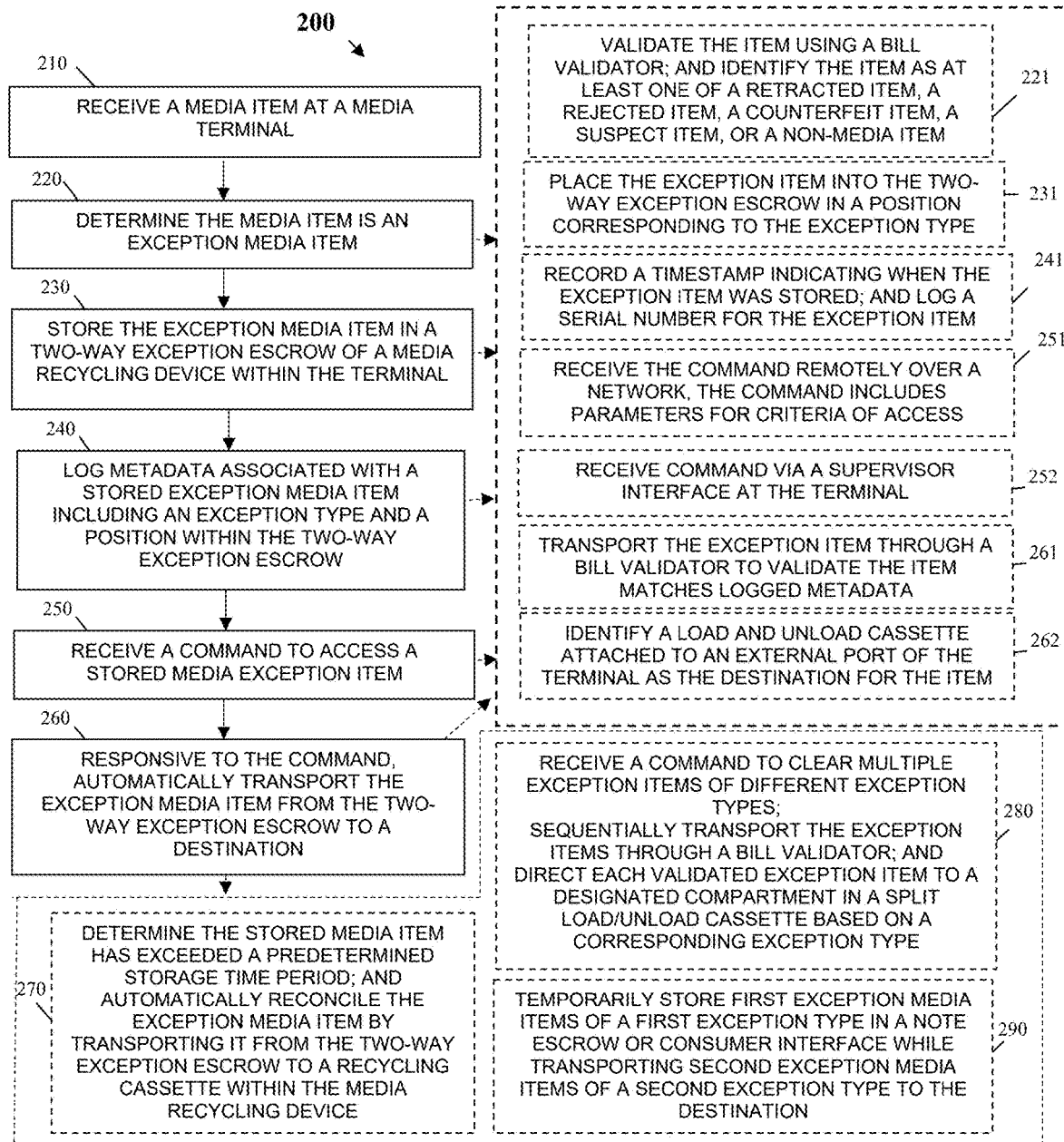
FIG. 2 is a flow diagram of a method for automated exception media access from a media recycling device, according to an example embodiment.

The above-referenced embodiments and other embodiments are now discussed with reference to FIG. 2. FIG. 2 is a flow diagram of a method 200 for automated exception media access from a media recycling device, according to an example embodiment. The software module(s) that implements the method 200 is referred to as a "media controller." The media controller is implemented as executable instructions programmed and residing within memory and/or a non-transitory computer-readable (processor-readable) storage medium and executed by one or more processors of one or more devices. The processor(s) of the device(s) that executes the media controller are specifically configured and programmed to process the media controller. The media controller may have access to one or more network connections during its processing. The network connections can be wired, wireless, or a combination of wired and wireless.

In an embodiment, the device that executes the media controller is media recycling device 120. In an embodiment, the media controller controls electromechanical devices 124-129 and optionally 130 of media recycling device 120 during media item exception processing for exception media items being deposited or dispensed during consumer-based and admin-based transaction on media terminal 110.

At 210, media controller detects receiving a media item at a media terminal 110. At 220, the media controller determines the media item is an exception media item by analyzing physical characteristics including dimensions, security features, and quality metrics through bill validator 125. The validation process generates detailed metadata about specific exception conditions detected, which is maintained in the media item or device logs to support future auditing and reconciliation In an embodiment, at 221, the media controller causes validation of the media item using a bill validator 125 and the media controller identifies at least one of a retracted item, a rejected item, a counterfeit item, a suspected counterfeit item, or a non-media item as an exception media item type for the exception media item.

At 230, the media controller causes storage of the exception media item in a two-way exception escrow 127 of a media recycling device 120 within the media terminal 110. In an embodiment, at 231, the media controller causes placement of the exception item into the two-way exception escrow 127 in a position corresponding to the exception type for the exception item.

At 240, the media controller logs metadata associated with a stored exception media item. The metadata includes an exception type and a position of the exception media item within the two-way exception escrow 127. In an embodiment, the position within the two-way exception escrow is mapped to the exception type. In an embodiment, at 241, the media controller records a timestamp indicating when the exception item was stored and the media controller logs a serial number for the exception item.

At 250, the media controller receives a command to access the stored media exception item. In an embodiment, at 251, the media controller receives the command remotely over a network, the command includes parameters for criteria of access. In an embodiment, at 252, the media controller receives a command via a supervisor interface at the terminal; for example, via the UI of the admin manager 113.

At 260 and responsive to the command, the media controller causes the automatic transport of the exception media item from the two-way exception escrow 127 to a destination. In an embodiment, at 261, the media controller causes transport of the exception item through a bill validator 125 to validate the exception item matches logged metadata. In an embodiment, at 262, the media controller identifies a load and unload cassette 230 attached to an external port of the media terminal 110 as the destination for the exception media item. In an embodiment, the media controller generates and issues an alert if there is a mismatch when the bill validator 125 validates the exception item by comparing the exception item against the logged metadata corresponding to the exception item.

In an embodiment, at 270, the media controller determines the stored media item has exceeded a predetermined storage time period. The media controller automatically reconciles the exception media item by transporting the exception media item from the two-way exception escrow 127 to a recycling cassette 129 or an all-in bin 128 within the media recycling device 120.

In an embodiment, at 280, the media controller receives a command to clear multiple exception items of different exception types. The media controller causes sequential transporting of the exception items through a bill validator 125. The media controller directs each validated exception item to a designated compartment in a split load/unload cassette 130 based on a corresponding exception type.

In an embodiment, at 290, the media controller causes temporarily storage of first exception media items of a first exception type in a note escrow 126 while transporting second exception media items of a second exception type to the destination. In an embodiment, the first exception media items of the first exception type are temporarily stored in a consumer interface 124.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method comprising:
   receiving a media item at a media terminal;
   determining the media item is an exception media item;
   storing the exception media item in a two-way exception escrow of a media recycling device within the media terminal;
   logging metadata associated with a stored exception media item including an exception type and a position within the two-way exception escrow;
   receiving a command to access the stored exception media item; and
   responsive to the command, automatically transporting the exception media item from the two-way exception escrow to a destination.

2. The method of claim 1, wherein determining comprises:
   validating the media item using a bill validator; and
   identifying the media item as at least one of: a retracted media item, a rejected media item, a counterfeit media item, a suspected counterfeit media item, or a non-media item.

3. The method of claim 1, wherein storing comprises:
   placing the exception media item into the two-way exception escrow in a position corresponding to the exception type.

4. The method of claim 1, wherein logging comprises:
   recording a timestamp indicating when the exception media item was stored; and
   logging a serial number of the exception media item.

5. The method of claim 1, wherein receiving comprises:
   receiving the command remotely over a network, wherein the command includes parameters specifying criteria for accessing stored exception media items.

6. The method of claim 1, wherein receiving comprises:
   receiving the command via a supervisor interface at the media terminal.

7. The method of claim 1, wherein automatically transporting comprises:
   transporting the exception media item through a bill validator to validate the exception media item matches logged metadata.

8. The method of claim 1, wherein automatically transporting comprises:
   identifying a load and unload cassette attached to an external port of the media terminal as the destination for the exception media item.

9. The method of claim 1 further comprising:
   determining the stored exception media item has exceeded a predetermined storage time period; and
   automatically reconciling the exception media item by transporting the exception media item from the two-way exception escrow to a recycling cassette within the media recycling device.

10. The method of claim 1 further comprising:
    receiving a command to clear multiple exception media items of different exception types;
    sequentially transporting the multiple exception media items through a bill validator; and
    directing each validated exception media item to a designated compartment in a split load/unload cassette based on a corresponding exception type.

11. The method of claim 1 further comprising:
    temporarily storing first exception media items of a first exception type in a note escrow while transporting second exception media items of a second exception type to the destination.

12. A media recycling device comprising:
    a two-way exception escrow configured to store and retrieve exception media items;
    a bill validator configured to authenticate media items and determine exception types;
    a processor; and
    a memory storing instructions that, when executed by the processor, cause the media recycling device to:
      log metadata for exception media items stored in the two-way exception escrow, including, for each exception media item, an exception type and a position within the two-way exception escrow;
      receive commands to access stored exception media items; and
      automatically transport exception media items between the two-way exception escrow and designated destinations based on received commands.

13. The media recycling device of claim 12, wherein the two-way exception escrow comprises:
    multiple compartments, each compartment designated for storing exception media items of a specific exception type.

14. The media recycling device of claim 12, wherein the metadata comprises:
    a timestamp indicating when each exception media item was stored;
    a position indicating where each exception media item is located within the two-way exception escrow or within a particular designated destination; and
    a serial number of each stored exception media item at the particular designated destination.

15. The media recycling device of claim 12, wherein the instructions further cause the media recycling device to:
    monitor storage duration of exception media items;
    identify exception media items that exceed a predetermined storage period; and
    automatically reconcile identified exception media items by transporting them to one or more recycling cassettes.

16. The media recycling device of claim 12, wherein the designated destinations includes one or more of:
    a split load/unload cassette having separate compartments for different exception types; and causing the media recycling device to direct the exception media items to specific compartments based on respective exception types.

17. The media recycling device of claim 12, wherein the instructions further cause the media recycling device to:
temporarily store first exception media items of a first exception type in a note escrow while transporting second exception media items of a second exception type to a particular designated destination.

18. The media recycling device of claim 12 further comprising:
a network interface configured to receive remote commands specifying criteria for accessing stored exception media items;
wherein the criteria includes at least one of: exception type, storage duration, and destination location.

19. A system, comprising:
a media terminal including:
a consumer interface for receiving and dispensing media items; and
a media recycling device comprising:
a two-way exception escrow configured to store and retrieve exception media items;
a bill validator configured to authenticate media items and determine exception types;
a note escrow configured to temporarily store media items during transport operations;
a processor; and
a memory storing instructions that, when executed by the processor, cause the media recycling device to:
store exception media items in the two-way exception escrow;
log metadata for stored exception media items including exception type, position data, and timestamp;
receive commands specifying criteria for accessing stored exception media items; and
responsive to the commands, automatically transport exception media items between the two-way exception escrow and designated destinations through the bill validator.

20. The system of claim 19, wherein the instructions further cause the media recycling device to:
validate serial numbers of exception media items during transport through the bill validator;
compare validated serial numbers against logged metadata to verify exception media items match their logged positions in the two-way exception escrow; and
generate an alert if a mismatch is detected.

* * * * *